United States Patent
LaConti et al.

[11] Patent Number: 6,083,641
[45] Date of Patent: Jul. 4, 2000

[54] TITANIUM CARBIDE BIPOLAR PLATE FOR ELECTROCHEMICAL DEVICES

[75] Inventors: Anthony B. LaConti, Lynnfield; Arthur E. Griffith, Lynn; Cecelia C. Cropley, Acton; John A. Kosek, Danvers, all of Mass.

[73] Assignee: The United States of America as represented by the United States Department of Energy, Washington, D.C.

[21] Appl. No.: 09/076,018

[22] Filed: May 8, 1998

[51] Int. Cl.[7] .............................. H01M 6/48; H01M 8/10; H01M 4/86; H01M 4/88
[52] U.S. Cl. ............................. 429/210; 429/32; 429/42; 502/101
[58] Field of Search ............................. 429/32, 42, 210; 502/101; 419/14

[56] References Cited

U.S. PATENT DOCUMENTS

| | | | |
|---|---|---|---|
| 3,880,689 | 4/1975 | Rolker et al. | 156/233 |
| 4,197,178 | 4/1980 | Pellegri et al. | 204/255 |
| 4,217,401 | 8/1980 | Pellegri et al. | 429/39 |
| 4,528,121 | 7/1985 | Matsushita et al. | 252/516 |
| 4,619,753 | 10/1986 | Christen et al. | 204/290 F |
| 4,795,684 | 1/1989 | Jalan et al. | 429/44 |
| 5,270,126 | 12/1993 | Aoki | 429/12 |
| 5,624,769 | 4/1997 | Li et al. | 429/32 |

FOREIGN PATENT DOCUMENTS 64-89153   4/1989   Japan .

*Primary Examiner*—Kathryn Gorgos
*Assistant Examiner*—Edna Wong
*Attorney, Agent, or Firm*—Bradley W. Smith; Mark P. Dvorscak; William R. Moser

[57] ABSTRACT

A corrosion resistant, electrically conductive, non-porous bipolar plate is made from titanium carbide for use in an eletrochemical device. The process involves blending titanium carbide powder with a suitable binder material, and molding the mixture, at an elevated temperature and pressure.

7 Claims, 2 Drawing Sheets

CORROSION CURRENTS OF BIPOLAR PLATES IN HOT CONCENTRATED PHOSPHORIC ACID AS A FUNCTION OF POTENTIAL (FOLLOWING CORROSION AT 1.0 V FOR 1000 MIN. IN 190°C, 100-wt% $H_3PO_4$).

ns6,083,641

TITANIUM CARBIDE BIPOLAR PLATE FOR ELECTROCHEMICAL DEVICES

CONTRACTUAL ORIGIN OF THE INVENTION

The United States Government has rights in this invention pursuant to Contract Number DE-FG02-90ER80861 between the United States Government and Giner, Inc.

TECHNICAL FIELD

The present invention relates to the composition and method of manufacture of a bipolar plate for use in an electrochemical device. In particular, the invention is a titanium carbide bipolar plate formed by blending titanium carbide powder with a suitable binder material and molding the mixture, at an elevated temperature and pressure.

BACKGROUND OF INVENTION

Electrochemical devices, including fuel cells and electrolytic cells, generally involve producing electric current or desired chemical compounds by interconverting electrical and chemical energy. A typical electrochemical device includes an anode (fuel electrode), a cathode (air or oxygen electrode), an ion-conducting electrolyte positioned between the anode and cathode, and a separator, or bipolar plate, for separating the anode of one cell from the cathode of an adjacent cell and conducting electrical current. Fuel cells generate electrical energy by promoting the chemical reactions at the electrodes. More specifically, fuel gas is supplied to the anode surface producing an electron-generating oxidation reaction, oxygen is supplied to the cathode surface producing an electron-consuming reduction reaction, electric charge is transferred from the anode to the cathode through the bipolar plate, and internal charge transfer is accomplished through the electrolyte. Conversely, electrolytic cells produce desired chemical compounds by driving chemical changes in the electrochemical cell with the passage of electric current through the electrolyte. For example, a water electrolyzer produces hydrogen and oxygen, and chlorine production is accomplished by the electrolysis of aqueous solutions of sodium chloride and hydrochloric acid.

A plurality of electrochemical cells are generally stacked together in electrical series to produce a useful voltage. To form the cell stack, bipolar plates electronically connect the anode of one cell with the cathode of an adjacent cell. Bipolar plates may also include structures, e.g. flow fields, for evenly distributing the reactants over the active surfaces of the electrochemical cell, or the bipolar plates may provide support for such structures within the electrochemical cell. Where a liquid electrolyte is used, bipolar plates may further incorporate reservoirs for replenishing the electrolyte supply.

Bipolar plates serve as both current collectors and separation barriers within electrochemical cell stacks. As a current collector, bipolar plates provide an electrical connection between adjacent electrochemical cells, and, therefore, bipolar plates must exhibit good electrical conductivity. As a separation barrier, bipolar plates isolate the anode and cathode reactants and products within one cell from those in an adjacent cell, requiring them to be impervious to the electrochemical cell reactants and products, as well as any liquid electrolyte, and resistant to corrosion under the operating conditions of the electrochemical device. Operating conditions frequently include harshly acidic environments, high electrical potentials, and high temperatures. Ideally, bipolar plates are also easy to fabricate, physically durable, thin, and lightweight.

Bipolar plates are critical to the efficient operation of advanced commercial multi-cell electrochemical devices, such as phosphoric acid fuel cells (PAFCs), regenerative proton exchange membrane (PEM) fuel cells, water and hydrogen chloride electrolytic cells, and lead-acid batteries. In these systems, one electrode operates at a high anodic potential, in the range of between about 1.0 to about 2.0 volts, as measured against the reversible hydrogen electrode reference (vs. RHE). PAFC bipolar plates are traditionally made of graphite and carbon-based materials, which severely corrode and are thermodynamically unstable at electrode potentials of greater than 0.8 volts vs. RHE. For example, bipolar plates made from graphite resin mixtures that are carbonized at low temperatures are unsuitable and rapidly degrade under the operating conditions of PAFCs, fuel cells having an electrolyte comprised of phosphoric acid ($H_3PO_4$). Heat treating these carbonized graphite plates reduces the corrosion current by two orders of magnitude at 0.8 volts in 97% $H_3PO_4$ PAFCs at 190° C., however, while slowed, the corrosion eventually limits the fuel cell's operating lifetime.

Corrosion problems are even more severe in more advanced electrochemical devices, such as in PEM electrolytic cells, where anodic potentials may exceed 1.8. volts vs. RHE and the bipolar plates are in constant contact with highly acidic solutions (about pH 0.0 to about pH 3.5). PEM fuel cells, also referred to as solid polymer electrolyte fuel cells (SPEFCs), utilize a solid polymer, proton-conducting membrane as an electrolyte, which is typically a perfluorinated sulfonic acid polymer electrolyte membrane. The PEM fuel cell operating environment includes strong acidic oxidizing and reducing conditions, and temperatures up to 125° C. PEM fuel cell bipolar plates are typically comprised of hydrophobic carbon felt paper and graphite support material. The conducting parts of the fuel cell frames may be titanium and the non-conducting parts polysulfone. PEM fuel cells are of current and specific interest in automotive applications, as they ameliorate environmental pollution problems associated with combustion engines and offer renewable source of energy.

One approach to the problem of bipolar plate corrosion is to use materials having the ability to withstand the oxidizing conditions within the electrochemical cell, such as titanium, niobium, and tantalum. These metals, however, are prohibitively expensive. In addition, in highly acidic applications, such as PEM fuel cell applications, these metals are subject to anodic dissolution at the cathode, hydrogen embrittlement at the anode, and the formation of electronically resistive oxide films. Platinizing the metal in the active area of the oxygen electrode to maintain its conductivity is possible, however, this involves molding a graphite polymeric binder base plate and covering it with a platinized metal foil, such as tin, also a very expensive process because of the composite structure of the bipolar plate.

For electrochemical devices to become a competitive energy technology, the power densities and operating lifetimes of the devices must be increased and the manufacturing and operating costs reduced. In particular, a need continues for an easily fabricated, economic, non-corrosive, highly electronically conductive bipolar plate material for use in electrochemical devices operating at high potentials and in harshly acidic environments.

The present invention is a corrosion resistant titanium carbide bipolar plate formed by blending titanium carbide powder with a suitable binder material and molding the mixture, at an elevated temperature and pressure. The molded titanium carbide bipolar plates have long term mechanical and thermodynamic stability in acidic media at high anodic potentials and exhibit good electrical conductivity. In addition, the method of molding the bipolar plate is economically attractive and allows for greater flexibility in the design of the plate than traditional machining processes.

Therefore, in view of the above, a basic object of the present invention is to provide a bipolar plate capable of withstanding high potentials and harshly acidic environments within electrochemical cells.

Another object of this invention is to provide a bipolar plate that has good electrical conductivity and is resistant to corrosion under the operating conditions of the electrochemical device.

Yet another object of this invention is to provide a low cost, physically durable bipolar plate that is easy to fabricate.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

This invention is a composition and method of making a bipolar plate comprised of titanium carbide for use in an electrochemical device. The process involves blending titanium carbide powder with a suitable binder and molding the mixture, at an elevated temperature.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE INVENTION

The present invention relates to the composition and method of manufacture of a bipolar plate for use in an electrochemical device. In particular, the invention is a titanium carbide (TiC) bipolar plate formed by blending TiC powder with a suitable binder material, and pressing the mixture into a mold, at an elevated temperature and pressure.

The molded TiC bipolar plates are especially designed for use in high temperature electrochemical devices operated at high electrical potentials of greater than about 0.8, relative to the standard reversible hydrogen electrode (vs. RHE), and in harshly acidic environments. For example, phosphoric acid fuel cells (PAFCs) have an electrolyte comprised of acid concentrations of up to 100% phosphoric acid ($H_3PO_4$) and are operated at temperatures of about 200° C.

Molded TiC bipolar plates were prepared by blending TiC powder with a binder material and pressing the mixture into a mold. Suitable binders include, but are not limited to, polysulfone (PSO, PSU), polyvinylidene fluoride resin (e.g., KYNAR Registered trademark), polyethylene (PE), polypropylene (PP), fluoroethylenepropylene (FEP), polyimide (PI), polyetheretherketone (PEEK), polyetherketone (PEK), polyphenylene sulfide (PPS), and polybenzyimidazole (PBI). The mixture is heated to a temperature in the range of between about 175° C. and about 190° C., and preferably to a temperature of about 190° C., and subjected to a pressure in the range of between about 10,000 psi and about 40,000 psi, and preferably to a pressure of about 30,000 psi.

The molded TiC bipolar plates are electrochemically more stable and exhibit superior corrosion resistance than commercially available carbon or graphite catalyst supports in various acidic media and at potentials in excess of about 0.8 to about 1.2 volts vs. RHE. In addition, the corrosion current in a 190° C. 100 wt % $H_3PO_4$ PAFC having a molded TiC plate was also found to increase much more slowly with increasing potential than that of a PAFC having a carbon plate, which rose sharply at potentials above about 1.0 volts. The molded TiC plates also have superior electrical conductivity, for example, the conductivity of TiC is approximately five times higher than that of graphite. The ability to mold the TiC bipolar plates is an important design feature for low-cost electrochemical devices, since the cost to mold the TiC plates is much less than the cost to machine them. In sum, the corrosion resistance, high conductivity, relatively low cost, and flexibility of design of the molded TiC plates make them highly suitable for use in bipolar regenerative PEM fuel cells, lead-acid batteries, water electrolyzers, and other advanced electrochemical systems, which require materials that are stable at high anodic potentials.

EXAMPLE 1

Figure 1:
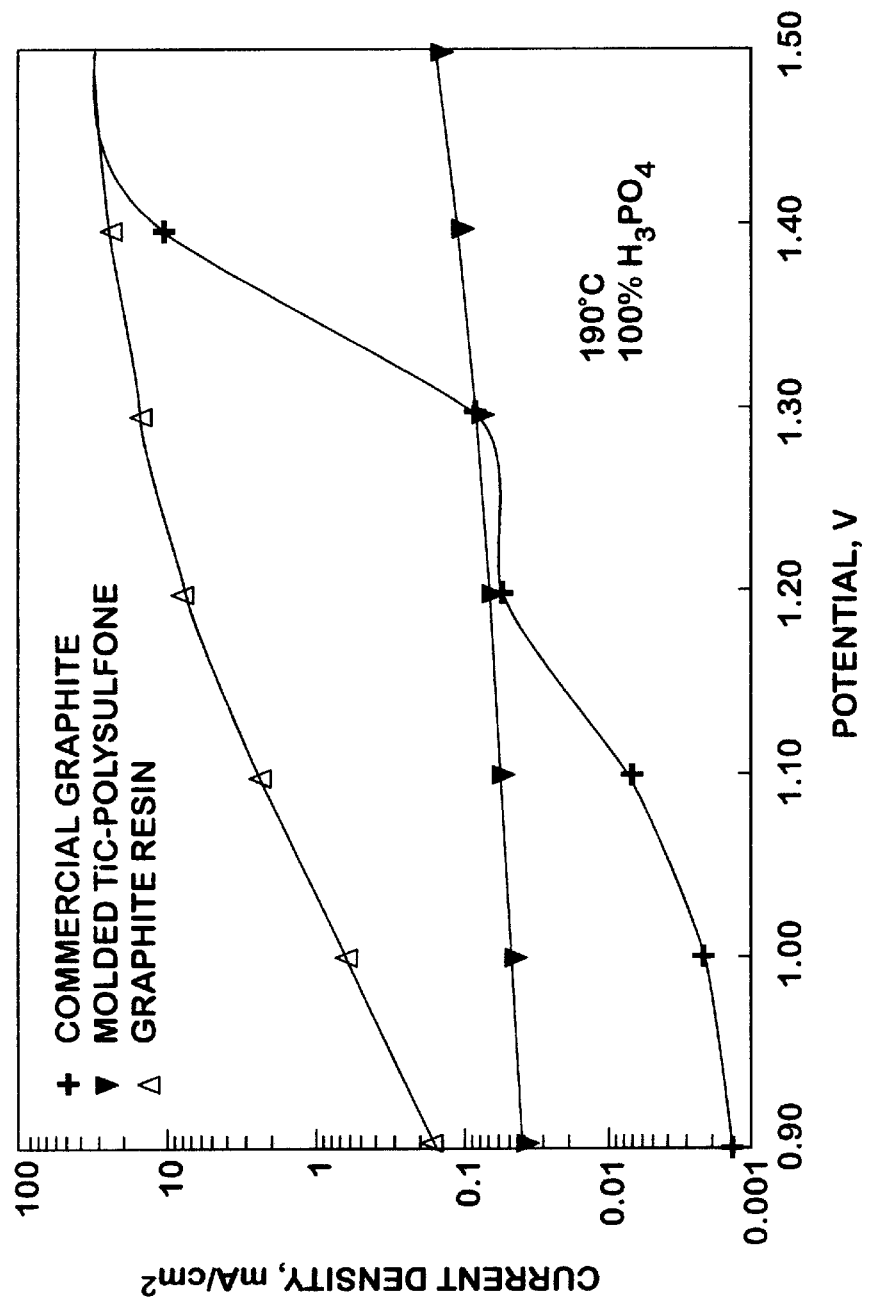
FIG. 1 is a graphical comparison of corrosion currents in a bipolar plate comprised of graphite, a bipolar plate comprised of molded titanium carbide (TiC)-polysulfone, and a bipolar plate comprised of graphite resin.

A molded titanium carbide (TiC) plate was prepared for use in a phosphoric acid fuel cell (PAFC) electrochemical device by blending TiC powder with a polysulfone binder, pressing the mixture into a mold, and heating the mixture to a temperature of about 190° C. The molded TiC-polysulfone plate demonstrated a resistivity of 0.009 Ω·cm, which is half the resistivity of a commercially available pure graphite plate. The bipolar plate was tested in a 100-wt % PAFC device at a temperature of 190° C. FIG. 1. is a graph of voltage verses corrosion current density for the molded TiC-polysulfone plate, a commercial graphite plate, and a commercial graphite resin plate. The graph indicates that the corrosion current of the molded TiC-polysulfone plate is significantly lower than that of the two commercially available graphite plates, at potentials above 1.3 volts vs. RHE. FIG. 1 further shows that at potentials as low as 0.9 volts vs. RHE, the corrosion current of the molded TiC-polysulfone plate was significantly lower than the graphite-resin plate, and at a potential of 1.5 volts vs. RHE, the corrosion current of the molded TiC-polysulfone plate was two orders of magnitude lower than either of the commercially available graphite plates. The flatness of the plotted curve indicates that the molded TiC-polysulfone plate is likely to be stable at even higher anodic potentials.

EXAMPLE 2

Figure 2:
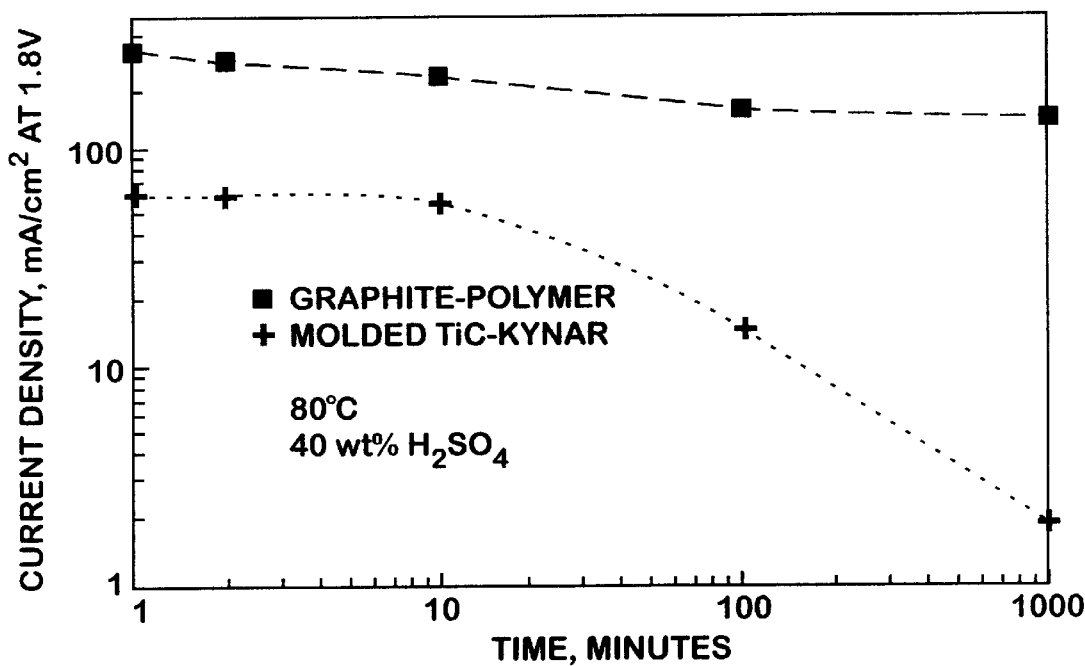
FIG. 2 is a graphical comparison of corrosion currents in a bipolar plate comprised of graphite and a bipolar plate comprised of molded TiC-polyvinylidene fluoride resin.
Figure 3:
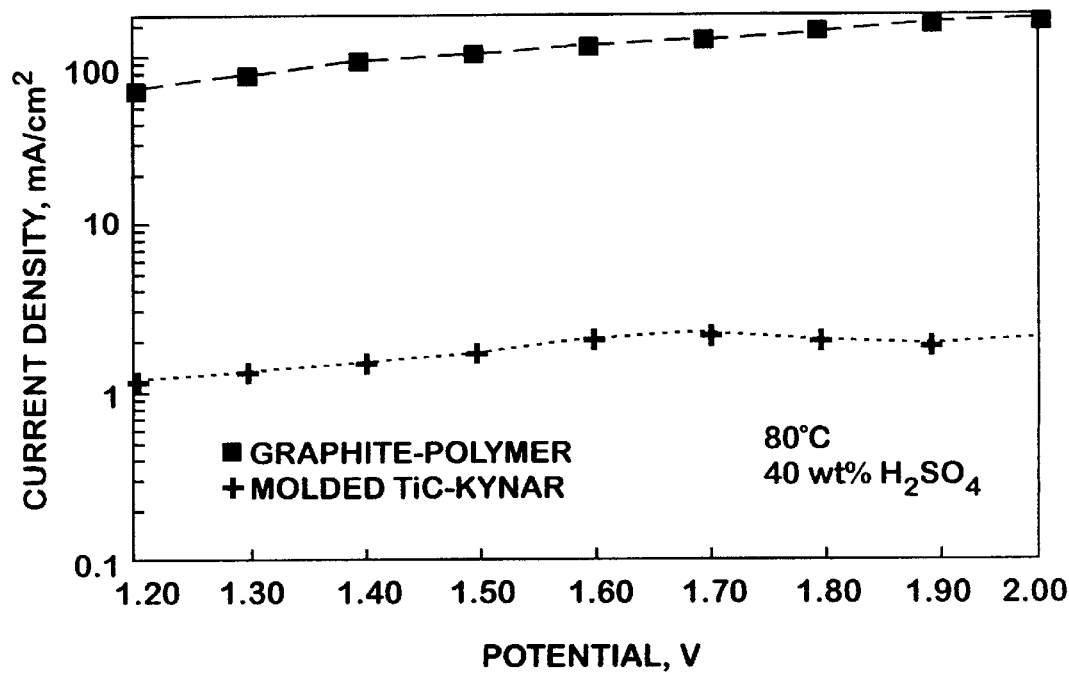
FIG. 3 is a graphical comparison of corrosion currents in a bipolar plate comprised of graphite-polymer and a bipolar plate comprised of molded TiC-polyvinylidene fluoride resin.

A molded titanium carbide (TiC) plate was prepared for use in a PAFC electrochemical device by blending TiC powder with a polyvinylidene fluoride resin binder, pressing the mixture into a mold, and heating the mixture to a temperature of about 190° C. Corrosion currents of the molded TiC-polyvinylidene fluoride resin plate and a commercially available bipolar graphite-polymer plate were measured in a 40-wt % $H_2SO_4$ PAFC device at a temperature of 80° C. and at high anodic potentials. FIG. 2 shows that following 1000 minutes at 1.8 volts, the corrosion current of the molded TiC-polyvinylidene fluoride resin plate was two orders of magnitude lower than that of the graphite-polymer plate. The rapid decrease in the corrosion current for the molded TiC-polyvinylidene fluoride resin plate from approximately 100 minutes to 1000 minutes demonstrates that the steady-state corrosion rate may be considerably lower than that observed at 1000 minutes. In a polarization scan from 1.2 to 2.0 volts following this testing, the corrosion current of the molded TiC-polyvinylidene fluoride resin plate was nearly invariant with increasing potential, particularly at potentials above 1.6 volts, and continued to be two orders of magnitude lower than that of the graphite-polymer plate, as shown in FIG. 3. Additionally, the graphite-polymer plate was severely deformed during this testing, with the thickness of the plate in the area exposed to the acid being nearly double the original thickness and a measured weight gain of about 5%. In contrast, the appearance and thickness of the molded TiC-polyvinylidene fluoride resin plate did not visibly change, and a weight loss of approximately 1% was measured.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

What is claimed is:

1. An electrochemical device, comprising:
   a plurality of single fuel cells connected in electrical series, each fuel cell being comprised of a positive electrode, a negative electrode, and a separator that contains an electrolyte; and
   at least one bipolar plate comprised of titanium carbide disposed between adjacent single fuel cells.

2. The electrochemical device according to claim 1, wherein the titanium carbide is powder blended with a binder material and hot pressed at temperatures in the range of between about 175° C. and about 190° C., and pressures in the range of between about 10,000 psi and about 40,000 psi.

3. The electrochemical device according to claim 1, wherein the titanium carbide is powder blended with a binder material and hot pressed at a temperature of about 190° C. and a pressure of about 30,000 psi.

4. The electrochemical device according to claim 1 or 3, wherein the binder is selected from a group consisting of polysulfone, polyvinylidene fluoride resin, polyethylene, polypropylene, fluoroethylenepropylene, polyimide, polyetheretherketone, polyetherketone, polyphenylene sulfide, and polybenzyimidazole.

5. The electrochemical device according to claim 1, wherein the bipolar plate is a flat plate having integral ribs that define gas flow passages between the adjacent single fuel cells.

6. The electrochemical device according to claim 1, wherein the single fuel cells are phosphoric acid fuel cells.

7. The electrochemical device according to claim 1, wherein the single fuel cells are regenerative proton exchange membrane fuel cells.

* * * * *